March 16, 1954     M. R. MORROW     2,672,034
DEHYDRATION OF LIQUEFIED PETROLEUM GAS
Filed Oct. 26, 1950
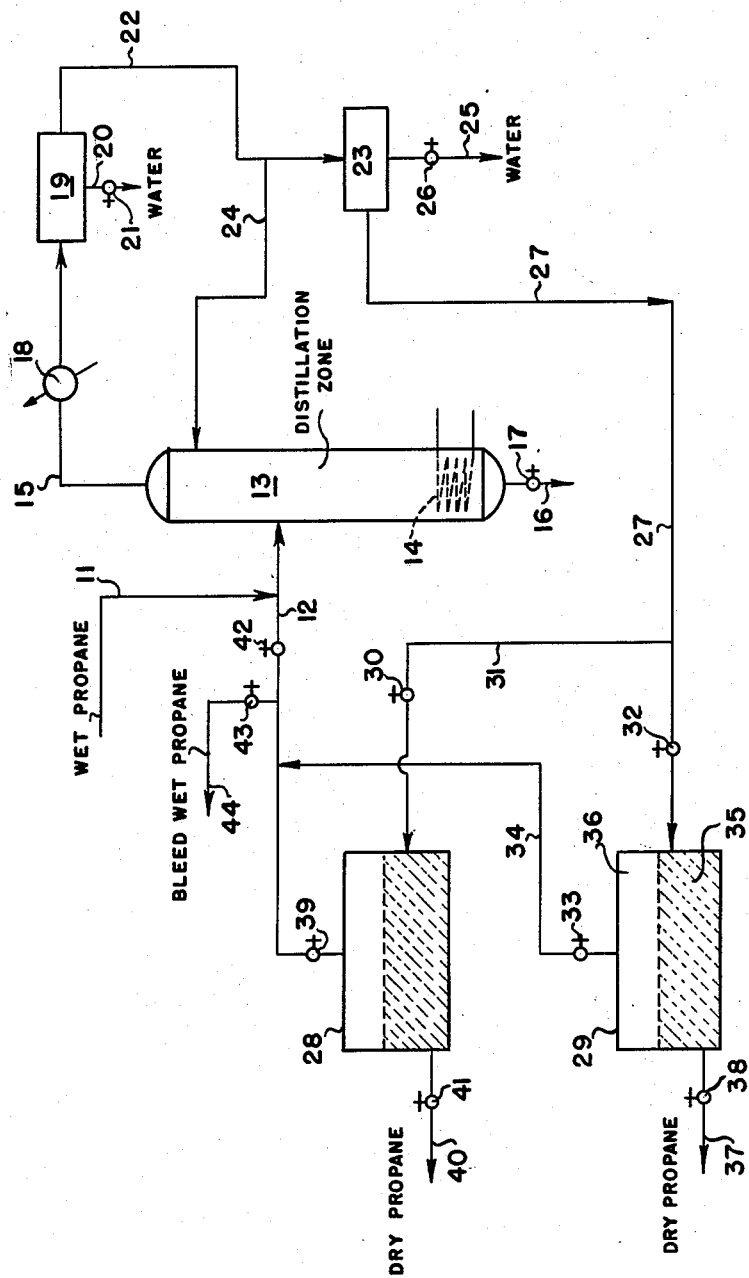
Morris R. Morrow, INVENTOR.
BY
AGENT.

Patented Mar. 16, 1954

2,672,034

UNITED STATES PATENT OFFICE 2,672,034

DEHYDRATION OF LIQUEFIED PETROLEUM GAS

Morris R. Morrow, Baytown, Tex., assignor, by mesne assignments, to Standard Oil Development Company, Elizabeth, N. J., a corporation of Delaware Application October 26, 1950, Serial No. 192,280

9 Claims. (Cl. 62—175.5)

The present invention is directed to a method for dehydrating liquefied normally gaseous hydrocarbons. More particularly, the invention is directed to the removal of water as such or as hydrates from liquefied normally gaseous hydrocarbons having no more than four carbon atoms in the molecule. More particularly, the invention has to do with the production of substantially dehydrated propane and butane for sale as a liquefied petroleum gas.

This application is a continuation-in-part of Serial No. 22,023, filed April 19, 1948, now abandoned, in the name of Morris R. Morrow and entitled "Production of Dehydrated Liquefied Petroleum Gas."

In recent years there has built up a large market for liquefied petroleum gases. This market has been filled by the natural gasoline industry from its supplies of propane and butane. It has been the practice to liquefy these normally gaseous hydrocarbons and place the material on sale for domestic and industrial purposes. In marketing these liquefied gases, it is important that substantially all water either as such or in the form of hydrates be removed from the liquefied gases. If the water is not removed, there is considerable danger of line and storage vessel plugging by the formation of hydrates and ice during the employment of these gases as fuels.

The industry has taken cognizance of the requirements for a substantially dehydrated fuel and has employed the conventional dehydrating media in removing water and preventing hydrate formation. For example, gases and liquefied gases have been contacted with hygroscopic material which removed water vapors. Calcium chloride brine and diethylene glycol have been used in removing water from liquefied petroleum gases. Adsorption media such as silica gel and other solids that have an affinity for water have also been used in removing water from liquefied petroleum gases.

It will be seen that the foregoing prior art methods require special equipment and chemicals for removing water from the normally gaseous material before it is suitable for use as a fuel.

It is, therefore, an object of the present invention to provide a simple and economical process for removing water from normally gaseous hydrocarbons by a process involving distillation and flashing.

Another object of the present invention is to provide a substantially dehydrated propane which is suitable for use as a fuel.

A still further object of the present invention is to provide a process in which a water-containing hydrocarbon having no more than four carbon atoms is subjected to a sequence of distilling and flashing steps to remove substantially all water therefrom.

The objects of the present invention may be achieved by subjecting a water-wet hydrocarbon having three to four carbon atoms in the molecule to distillation, following which the condensed overhead fraction has water removed from it, and is then subjected to a flashing operation to remove further quantities of water therefrom.

Briefly then the invention may be described as involving forming a stream of a water-containing hydrocarbon fraction such as propane or butane, subjecting the water-containing stream to distillation to form an overhead fraction including substantially all the water contained in the feed stream, and condensing the overhead fraction to form a hydrocarbon phase and a water phase. The water phase is separated from the hydrocarbon phase and is removed from the system while the hydrocarbon phase is then subjected to a simple flashing operation to remove additional quantities of water. The remaining liquid hydrocarbon phase is substantially dehydrated and is suitable for use as a fuel for domestic and industrial uses.

The hydrocarbons employed in the present invention ordinarily will be propane, isobutane, and normal butane. The invention has greatest application to the paraffinic hydrocarbons having three to four carbon atoms in the molecule, but it also has application to removal of water from the olefinic hydrocarbons having three to four carbon atoms in the molecule. For example, the butylenes, propylene, and butadiene are important feed stocks to catalytic conversion operations such as alkylation and polymerization. In some of the catalytic conversion operations it is very important that substantially all water be removed from the feed stocks. The present invention therefore has application to the removal of water from such hydrocarbons.

The temperatures employed in the flashing operation of the present invention range from about 20° F. to about 100° F. with temperatures from about 40° to about 70° F. being a preferred range. Good results may be obtained by flashing the wet hydrocarbon at a temperature in the range between about 60° to 70° F.

The invention will now be further illustrated by reference to the drawing in which the single figure represents a flow diagram showing a preferred mode thereof.

Referring now to the drawing, numeral 11 designates a feed line through which a stream including, for example, propane containing a substantial amount of water is introduced into the system from a source not shown. The wet propane discharges into line 12 which in turn conducts the wet propane into a distillation zone 13 which is illustrated as a single distillation tower. Distillation zone 13 will be understood to include suitable internal baffling equipment such as bubble cap trays and other contacting devices to insure intimate contact between vapors and liquids. In distillation zone 13 temperature and pressure conditions are adjusted by a heating means illustrated by heating coil 14 to obtain as an overhead fraction by line 15 a fraction including substantially propane and the water charged with the wet propane stream. The conditions employed in distillation zone 13 will vary depending on the hydrocarbon composition of the feed stock. If it is assumed that distillation zone 13 is a distillation tower including about 30 plates and the feed mixture includes normal butane, isobutane, and propane, the propane would be removed as an overhead product and the normal butane and isobutane mixture as a bottoms product. Under these conditions, with cooling water at a temperature of about 80° F. it would be possible to operate zone 13 with a top temperature of about 90° F. and at a pressure of about 164 pounds per square inch gauge. The bottom temperature will be somewhat higher and should be sufficient to drive all the propane out of the mixture of isobutane and normal butane.

There are removed from the bottom of distillation zone 13 by line 16 controlled by valve 17 any higher boiling hydrocarbons such as iso and normal butane and the like which may have been included in the feed stream introduced by line 11.

The overhead fraction withdrawn by line 15 passes through a condenser 18 and thence into a drum 19 which is of sufficient capacity to allow a residence time for the formation of a liquid hydrocarbon phase and a water phase. The water is separated and withdrawn from drum 19 by line 20 controlled by valve 21 while the hydrocarbon phase is withdrawn by line 22. The stream flowing through line 22 is separated into two parts with one part being discharged by line 22 into a second drum 23 while the other part is diverted by line 24 to the top of distillation zone 13 to provide reflux therein. Drum 23 is similar to drum 19 and is of sufficient capacity to provide a residence time for a separation of any water contained in the stream introduced thereto by line 22. Any water that may separate in drum 23 may be withdrawn therefrom by line 25 controlled by valve 26.

The hydrocarbon, having removed therefrom substantially all water which is separable by gravity, is discharged from drum 23 by line 27 into either of drums 28 or 29. Assuming for the moment that valve 30 in line 31 is closed and valve 32 in line 27 is open, the propane is routed by line 27 into drum 29 until drum 29 contains a substantial amount of propane. After drum 29 has been filled to the point desired, valve 32 is closed and valve 30 in line 31 is opened and the propane is then routed to drum 28. Assuming that propane is being routed to drum 28 and drum 29 has been filled to the desired level with propane, valve 33 in line 34 connecting into line 12 is opened allowing a simple flashing operation to take place in drum 29. By reducing the pressure in drum 29, a liquid phase and a gas phase is formed therein. As a result, any water which is contained in the propane indicated by the shaded portion 35 is flashed into the portion of the vessel indicated by the numeral 36. This gas phase contains substantially a greater quantity of water than the liquid phase 35 and is bled into line 12 and may be discharged thereby along with the feed propane stream to distillation zone 13 as has been described. After the flashing operation has been concluded, valve 33 may be closed and a substantially dry propane withdrawn from vessel 29 by line 37 controlled by valve 38.

When drum 29 has been emptied propane may again be routed thereto by opening valve 32 in line 27. The propane in drum 28 may then be caused to undergo the flashing operation by opening valve 39 in line 12. After the flashing operation has been concluded, substantially dry propane may be withdrawn from drum 28 by line 40 controlled by valve 41.

Under some conditions it may be undesirable to charge to distillation zone 13 the propane containing water flashed from the propane in drums 28 and 29. Under these circumstances, valve 42 in line 12 is closed and valve 43 in line 44 is opened to allow the bleed wet propane stream to be discharged from the system for further use as may be desired.

It will be seen from the foregoing description taken with the drawing that a simple and effective process is provided whereby a feed hydrocarbon stream is subjected to a sequence of operations including distilling, condensing, and flashing to remove substantially all water therefrom.

The invention will be further illustrated by reference to the following example. A wet feed stream containing propane and water was charged to a distillation tower to obtain an overhead fraction including propane and substantially all the water contained in the feed stream. This stream was cooled and condensed and water separated therefrom. Twenty thousand volumes of the liquid propane stream from which water had been separated was then submitted to a flashing operation at a temperature of between 60° and 70° F. to remove 750 parts of propane and water. The propane subjected to the flashing operation contained about 40 parts per million of water and failed to pass the cobalt-bromide test. After the flashing operation, the liquid propane contained less than 23 parts per million of water and passed the cobalt-bromide test. A description of the cobalt-bromide test may be found in the Technical Standards of the Natural Gasoline Association of America and a description of the test method may be found in the Tentative N. G. A. A. Standard 2140, Revised July 1940, page 4.

This propane which had been treated in accordance with the present invention was then suitable for use as a domestic or industrial fuel.

In another example a hydrocarbon fraction containing propylene and propane with small amounts of ethylene and butanes was produced in a commercial distillation unit in an amount in excess of 2400 barrels per day. This fraction contained on an average of 15% of propylene and 80% propane, the remainder being ethylene and butanes. Actually the propylene content varied from about 5% to 30% by volume of the mixture. The propane-propylene fraction was then cooled in horizontal cylindrical drums until a total of 2552 barrels of the propane-propylene fraction was obtained. A sample representing the propane-propylene fraction was tested for water content which was found to be 20 parts per million of dissolved water. Following this analysis, the drums which were provided with piping connections and valves to permit flashing vapor from the top of the drums were opened to permit flashing of the contents thereof over a period of 2 hours. 160 barrels of the propane-propylene fraction as liquid was evaporated and removed from the drums as vapor. During the operation after 1 hour of the flashing operation the liquid propane-propylene fraction in the drums was sampled for water content. The analysis showed the propane-propylene fraction to contain below 10 parts per million of water.

As another example of the present invention, approximately 450 gallons of a butane fraction containing about 80 parts per million of dissolved water were charged to a still consisting of a horizontal drum surmounted by a fractionating column equivalent to approximately 10 theoretical trays at total reflux. This still was operated at an elevated pressure of about 75 pounds. Heat was applied to the still and vapor passed from the drum into the column and to a condenser connected to the column. The overhead was totally condensed. The condensate from the condenser was passed to a settler where the overhead was separated into liquid butane and water. The liquid butane was returned to the top of the column while the water remained in the settler or separator. The process of distillation was allowed to continue for a period of 4 to 5 hours until the water level in the settler remained approximately constant. Approximately 70 cubic centimeters of water were then withdrawn from the settler and discarded. The heating was discontinued and after the butane had been allowed to cool it was tested for water content and found to contain less than 10 parts per million of water.

In a still further example a butadiene stream of approximately 98% by volume of butadiene having a water content in the liquid state of 500 parts per million was evaporated to remove 80% by volume of the liquid butadiene. Analysis of the remaining liquefied butadiene showed it contained 184 parts per million of water.

A mixture of normal butylene and butane in the approximate ratio of 75% to 25% which contained 319 parts per million of water was vaporized to the extent of 80 volume per cent. The remaining 20 volume per cent of the butylene-butane fraction was analyzed and found to contain 82 parts per million of water.

The water content of the fractions including the propylene-propane fraction, the butadiene fraction and the butylene-butene fraction were determined by a modified Karl Fischer procedure (Angew. Chem. 48, 394 (1935).

It will be seen from the several examples that by proceeding in accordance with the present invention including a distillation operation and a flashing operation that it is possible to reduce to a marked extent the water content of a liquefied petroleum fraction having from 3 to 4 carbon atoms in the molecule.

The nature and objects of the present invention having been fully described and illustrated, what I wish to claim as new and useful and to secure by Letters Patent is:

1. A method for dehydrating a water-containing normally gaseous hydrocarbon feed having from three to four carbon atoms in the molecule which comprises rectifying said water-containing normally gaseous feed hydrocarbon to obtain an overhead fraction including hydrocarbon and substantially all the water in said feed and a bottoms fraction substantially free of water, condensing said overhead fraction and separating water therefrom, flashing said condensed overhead fraction to form a gaseous phase and a liquid phase, and recovering from said liquid phase a substantially dehydrated hydrocarbon.

2. A method in accordance with claim 1 in which the normally gaseous feed hydrocarbon is propane.

3. A method in accordance with claim 1 in which the normally gaseous feed hydrocarbon is butane.

4. A method for removing water from a water-containing normally gaseous feed hydrocarbon having from three to four carbon atoms in the molecule which comprises forming a feed stream of said normally gaseous feed hydrocarbon, rectifying said stream under conditions to obtain an overhead fraction including substantially all the water in said feed hydrocarbon and a bottoms fraction substantially free of water, condensing said overhead stream to form a hydrocarbon phase and a water phase, separating said water phase from said hydrocarbon phase, flashing said hydrocarbon phase to form a gaseous phase and a liquid phase, admixing said gaseous phase with water-containing feed hydrocarbon, and recovering from said liquid phase a substantially dehydrated hydrocarbon.

5. A method in accordance with claim 4 in which the normally gaseous feed hydrocarbon is propane.

6. A method in accordance with claim 4 in which the normally gaseous feed hydrocarbon is butane.

7. A method for dehydrating a water-containing propane stream which comprises feeding said propane stream to a rectification zone, rectifying said propane to obtain an overhead fraction including propane and substantially all the water in said feed propane and a bottoms fraction substantially free of water, condensing said overhead fraction and separating water therefrom, flashing said condensed overhead fraction to form a gaseous phase and a liquid phase, admixing said gaseous phase with said feed propane, and recovering from said liquid phase substantially dehydrated propane.

8. A method in accordance with claim 7 in which the water-containing propane stream is a mixture of propane and propylene.

9. A method for dehydrating a water-containing mixture of propane and butane which comprises feeding said mixture to a rectification zone, rectifying the mixture to obtain an overhead fraction including propane and butane and substantially all the water in the feed mixture and a bottoms fraction substantially free of water, condensing said overhead fraction and separating water therefrom, flashing said condensed overhead fraction to form a gaseous phase and a liquid phase, admixing said gaseous phase with said feed mixture and recovering from said liquid phase substantially dehydrated propane and butane.

MORRIS R. MORROW.

References Cited in the file of this patent

UNITED STATES PATENTS

| Number | Name | Date |
|---|---|---|
| 1,656,710 | Rudigier | Jan. 17, 1928 |
| 2,067,349 | Schuftan | Jan. 12, 1937 |

(Other references on following page)

UNITED STATES PATENTS

| Number | Name | Date |
|---|---|---|
| 2,225,045 | Gerlach | Dec. 17, 1940 |
| 2,278,750 | Walker | Apr. 7, 1942 |
| 2,288,461 | Keith | June 30, 1942 |
| 2,368,497 | Shipley | Jan. 30, 1945 |

FOREIGN PATENTS

| Number | Country | Date |
|---|---|---|
| 645,072 | Great Britain | Oct. 25, 1950 |

OTHER REFERENCES

Phase Equilibrium in Hydrocarbon Systems, by Reamer et al., Ind. and Eng. Chem., vol. 36 (1944), pp. 381–383.

Water Content of Propane, by Poettman et. al., Petroleum Refiner, December 1946, vol. 25, No. 12, pp. 125–128.

Ice and Refrigeration, June 1948, page 50, Figure 1.